United States Patent
Lee et al.

(10) Patent No.: US 9,877,490 B1
(45) Date of Patent: Jan. 30, 2018

(54) PORTABLE HOIST FOR AN ANIMAL CARCASS

(71) Applicants: Richard Lee, Carthage, TX (US); Matthew Michel, Carthage, TX (US)

(72) Inventors: Richard Lee, Carthage, TX (US); Matthew Michel, Carthage, TX (US)

( * ) Notice: Subject to any disclaimer, the term of this patent is extended or adjusted under 35 U.S.C. 154(b) by 0 days.

(21) Appl. No.: 15/621,654

(22) Filed: Jun. 13, 2017

Related U.S. Application Data (60) Provisional application No. 62/349,422, filed on Jun. 13, 2016.

(51) Int. Cl.
*A22B 5/06* (2006.01)
*B66C 23/44* (2006.01)
*A01M 31/00* (2006.01)
*B60P 1/54* (2006.01)

(52) U.S. Cl.
CPC .............. *A22B 5/06* (2013.01); *A01M 31/00* (2013.01); *B66C 23/44* (2013.01); *B60P 1/5471* (2013.01)

(58) Field of Classification Search
CPC .................................. A22B 5/06; B60R 9/06
USPC ....... 452/125, 128, 185, 187, 189, 132, 133; 414/462, 540, 542; 212/179, 180; 254/325, 283, 284, 335
See application file for complete search history.

(56) References Cited

U.S. PATENT DOCUMENTS

| | | | | |
|---|---|---|---|---|
| 4,806,063 A * | 2/1989 | York | ......................... | A22B 5/06 212/180 |
| 6,626,748 B2 * | 9/2003 | Homer, Sr. | ............. | A22B 7/006 414/540 |
| 6,921,007 B1 * | 7/2005 | Guerrant | .................... | B60R 9/06 224/519 |
| 7,059,955 B2 * | 6/2006 | Green | ..................... | B66C 23/04 452/189 |
| 7,201,552 B1 * | 4/2007 | Angel | ....................... | A22B 5/06 212/180 |
| 7,374,388 B2 * | 5/2008 | Holt | ....................... | B60P 1/5471 212/180 |
| 7,625,269 B2 * | 12/2009 | Godwin | .................... | A22B 5/06 452/129 |
| 7,845,622 B1 * | 12/2010 | Riggs | ...................... | B66C 23/44 212/180 |
| 7,931,524 B2 * | 4/2011 | McKenzie | ............... | A22B 5/06 452/187 |
| 8,210,912 B2 * | 7/2012 | Ugiansky | ................. | A22B 5/06 452/187 |
| 8,777,703 B1 * | 7/2014 | Herron | .................... | A22B 5/161 452/128 |
| 9,282,752 B1 * | 3/2016 | Wylie | ..................... | A22B 5/161 |

* cited by examiner

*Primary Examiner* — Richard Price, Jr.
(74) *Attorney, Agent, or Firm* — Robert C. Montgomery; Montgomery Patent & Design, LP (57) ABSTRACT

A portable hoist provides motorized hoisting and coincidental skinning of game animals. The hoist is preferably secured to an existing motor vehicle and is made using an adaptable segmented frame. A top frame portion includes an electric cable winch and may rotate to any orientation to position a hanging animal carcass where desired. A base portion of the hoist includes a pair of clamps which grip a hide portion of the animal. The winch is then used to simultaneously hoist and remove the hide of the animal.

20 Claims, 3 Drawing Sheets

PORTABLE HOIST FOR AN ANIMAL CARCASS

RELATED APPLICATIONS

The present invention is a Continuation-in-Part of the first invention described in and claiming the benefit of U.S. Provisional Patent Application No. 62/349,422 filed on Jun. 13, 2016, the entire disclosures of which are incorporated herein by reference.

FIELD OF THE INVENTION

The present invention relates generally to the field of skinning and more specifically relates to a device for skinning a large game animal.

BACKGROUND OF THE INVENTION

Skinning is the act of skin removal. The process is done with animals, mainly as a means to prepare the muscle tissues beneath for consumption or for use of the fur or tanning of the skin. The skin may also be used as a trophy, sold on the fur market, or, in the case of a declared pest, used as proof of kill to obtain a bounty from a government health, agricultural, or game agency. Two (2) common methods of skinning are open skinning and case skinning. Typically, large animals are open skinned and smaller animals are case skinned. Case skinning is a method where the skin is peeled from the animal like a sock. One would usually use this method if the animal is going to be stretched out or put in dry storage. Many smaller animals are case skinned, leaving the skin mostly undamaged in the shape of a tube.

Although the method of case skinning individual animals varies slightly, the general steps remain the same. To case skin an animal, it should be hung upside down by its feet. A cut should be made in one (1) foot, and continued up the leg, around the anus and down the other leg. From there the skin can be pulled down the animal as though removing a sweater.

Open skinning is a method where the skin is removed from the animal like a jacket. This method is generally used if the skin is going to be tanned immediately or frozen for storage. A skin removed by the open method can be used for wall hangings or rugs. Larger animals are often skinned using the open method.

Various attempts have been made to solve problems found in skinning art. Among these are found in: U.S. Pat. No. 5,562,534 to Alvin H. McGough; U.S. Pat. No. 5,782,684 to John V. Shaff; and U.S. Pat. App. Pub. No. 2007/0248443 to Raymond C. Stucks. These prior art references are representative of skinning.

None of the above inventions and patents, taken either singly or in combination, is seen to describe the invention as claimed. Thus, a need exists for a reliable portable game skinning device, and to avoid the above-mentioned problems.

SUMMARY OF THE INVENTION

In view of the foregoing disadvantages inherent in the prior art, it has been observed that there is need for a device for skinning a large game animal.

The object of the present invention is to provide a hoist which comprises a first frame section, a second frame section, a third frame section, a fourth frame section, an elbow section, a fifth frame section and a hitch attachment frame which is removeably secured to the fourth frame section. The first frame section comprises a first frame first end, a first frame second end, a first frame bend, which is located between the first frame first end and the first frame second end, a first bearing plate which is secured to the first frame second end, a swivel rod aperture which is disposed within the first frame second end and through the first bearing plate, a pulley mounted upon an interior side of the first frame adjacent the first frame first end, a winch in electrical communication with a power source which is mounted upon an interior side of the first frame adjacent the first frame second end and superjacent the first bearing plate and a cable which is in mechanical communication with the pulley, having a cable first end which is secured to the winch and a cable second end which has a first attachment means.

The second frame section comprises a second frame section first end, a second frame section second end, a second bearing plate which is disposed upon the second frame first end, a swivel rod which is disposed perpendicularly and centrally upon an exterior face of the second bearing plate and is capable of rotationally residing within the swivel rod aperture and a first frame connector aperture disposed within the second frame second end. The swivel rod is inserted into the swivel rod aperture while the first bearing plate rests upon the second bearing plate thereby permitting rotation of the first frame section along one (1) axis.

The third frame section comprises a third frame section first end, a third frame section second end, a second connector aperture disposed within the third frame section first end and a third connector aperture disposed within the third frame section second end. The second frame second end is removably secured to the third frame first end.

The fourth frame section comprises a fourth frame section first end, a fourth frame section second end, a fourth connector aperture which is disposed which is disposed within the fourth frame section first end and a fifth connector aperture which is disposed within the fourth frame section second end. The third frame second end is removably secured to the fourth frame first end.

The elbow frame section comprises an elbow frame section first end, an elbow frame section second end, an elbow bend which is located between the elbow frame first end and the elbow frame second end, a sixth connector aperture which is disposed within the elbow frame first end and a seventh connector aperture which is disposed within the elbow frame second end. The fourth frame second end is removably secured to the elbow frame first end.

The fifth frame section has a "T"-shape which comprises a fifth frame section first end, a fifth frame section second end, a fifth frame section third end, an eighth connector aperture disposed within the fifth frame member first end, a first end plate disposed upon the fifth frame member second end, a second end plate disposed upon the fifth frame member third end, a first clamp cable having a first clamp cable first end secured to the first end plate, a second attachment means secured to the first clamp cable second end, a second clamp cable having a second clamp cable first end secured to the second end plate and a third attachment means secured to the second clamp cable second end. The elbow frame second end is removably secured to the fifth frame first end.

A user may raise or lower an animal when the animal is secured to the first attachment means by actuation of the winch. The animal may be further secured between the second attachment means and the third attachment means.

The hitch attachment frame enables the hoist to be removably secured to a hitch of a vehicle.

In a separate embodiment of the device, the second frame second end is lengthwise selectably secured to the third frame first end by a first fastener disposed adjacent the second frame second end, the third frame second end is lengthwise selectably secured to the fourth frame first end by a second fastener disposed adjacent the third frame second end, the fourth frame second end is lengthwise selectably secured to the elbow frame first end by a third fastener disposed adjacent the fourth frame second end and the elbow frame second end is lengthwise selectably secured to the fifth frame first end by a fourth fastener disposed adjacent the elbow frame second end.

The hoist may further comprise of at least one brace comprising a brace eyelet at a first end and a hoist attachment means at a second end. Each brace is capable of being removably secured to the vehicle at the eyelet end and removably secured to the hoist at the hoist attachment means end. The attachment means may also comprise of a cable hook, a gambrel removably attached to the cable hook, a first gambrel hook disposed at a gambrel first end and a second gambrel hook disposed at a gambrel second end. The animal may be secured to the first gambrel hook and the second gambrel hook.

The first and second end plates may also comprise a respective end plate aperture and respective end plate fastener. Any clamp cable eyelet disposed upon any clamp cable first end is capable of being removably secured to a respective end plate by placement of a respective end plate fastener through a respective clamp cable eyelet and into the corresponding end plate aperture. The second and third attachment means may comprise of an adjustable clamp.

A switch box in electrical communication with the winch thereby enabling selective rotation thereof may also be provided. The hoist may also have a light source which is disposed at the first frame section first end is in electrical communication with the power source. The light source may be in electrical communication with the switch box.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 portable hoist
20 first frame section
22 swivel rod
24 first bearing plate
26 lamp
28 lamp cord
30 winch
32 winch mount
34 cable
36 pulley
37 pulley mount
40 second frame section
42 swivel rod aperture
44 second bearing plate
50 third frame section
54 fourth frame section
56 elbow frame section
58 fifth frame section
60 clamp cable
62 anchoring slot
64 fastener aperture
65 end plate
66 clamp cable eyelet
68 clamp
80 frame connection
84 frame connection aperture
82 adjusting fastener
90 hitch attachment frame
94 hitch receiver
100*a* first brace
100*b* second brace
102 brace eyelet
110 gambrel
112*a* first gambrel hook
112*b* second gambrel hook
114 gambrel mounting plate
115 cable hook
116 cord/rope
120 power cord
122 power connector
124 switch box
125 vehicle
150 animal
155 head
160 hide

DETAILED DESCRIPTION OF THE PREFERRED EMBODIMENT

Figure 1:
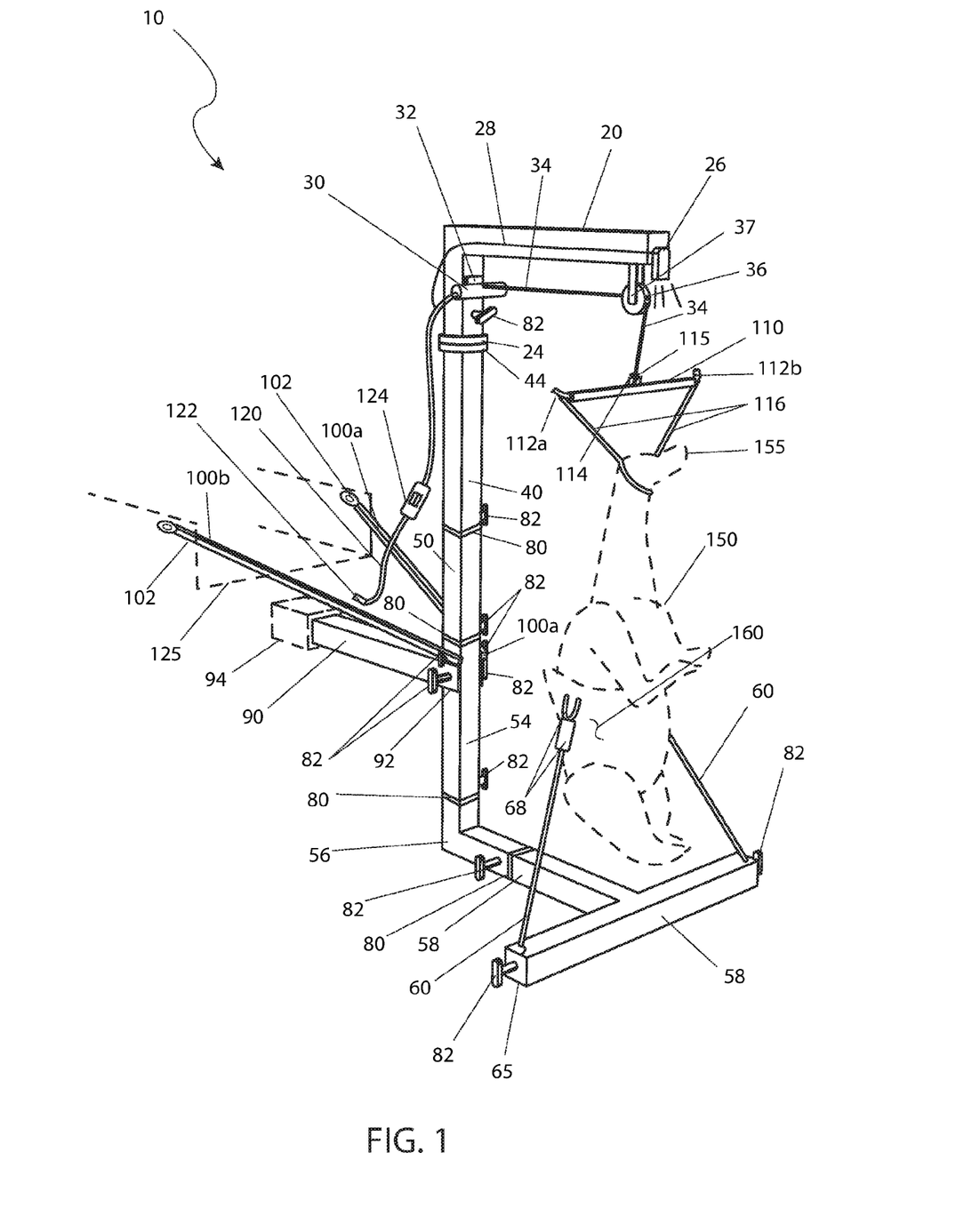
FIG. 1 is an environmental perspective view of a portable hoist 10 depicting attachment to an existing vehicle 125 such as a truck, according to a preferred embodiment of the present invention.
Figure 2:
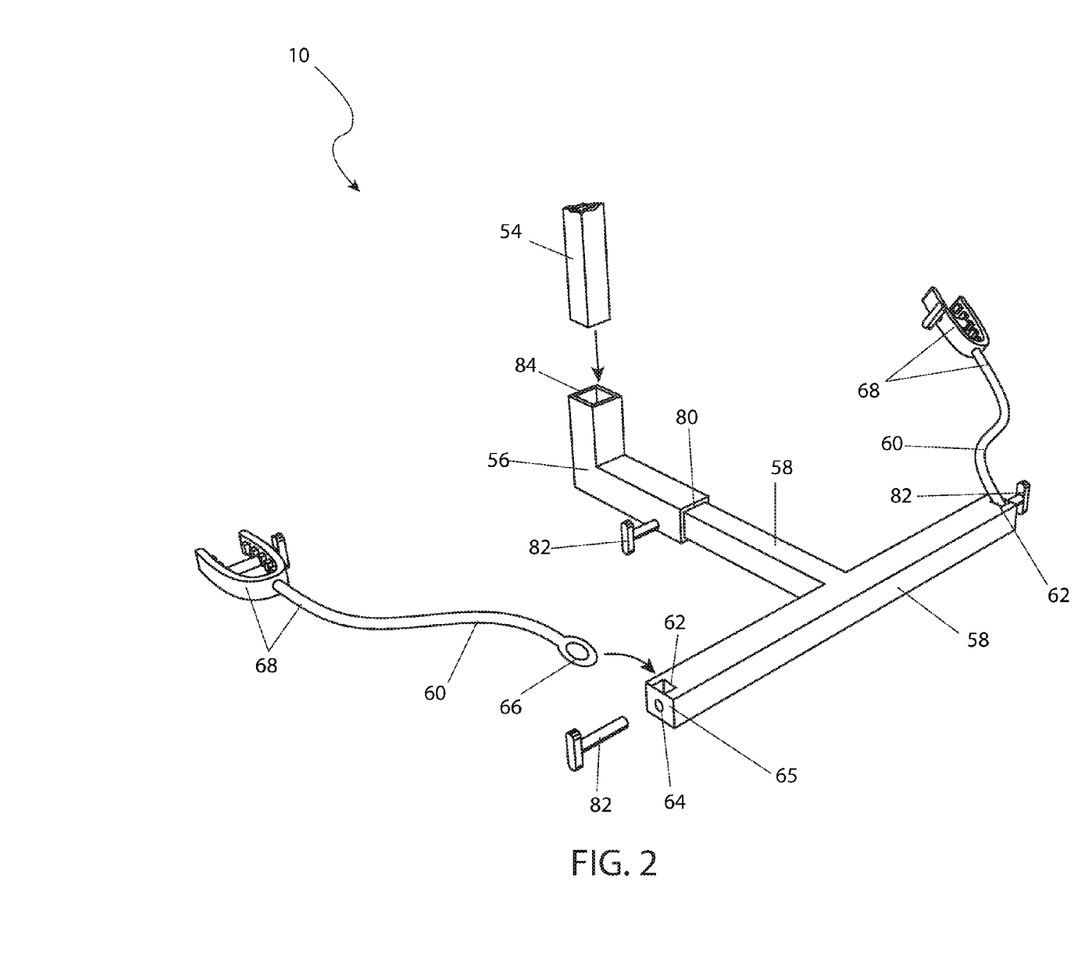
FIG. 2 is a perspective exploded view illustrating a subjacent and supporting fifth frame section 58 of the portable hoist 10, according to the preferred embodiment of the present invention; and, FIG. 3 is a perspective exploded view illustrating a rotational attachment means of the first frame section 20 and the second frame section 40 portions of the portable hoist 10, according to the preferred embodiment of the present invention.
Figure 3:
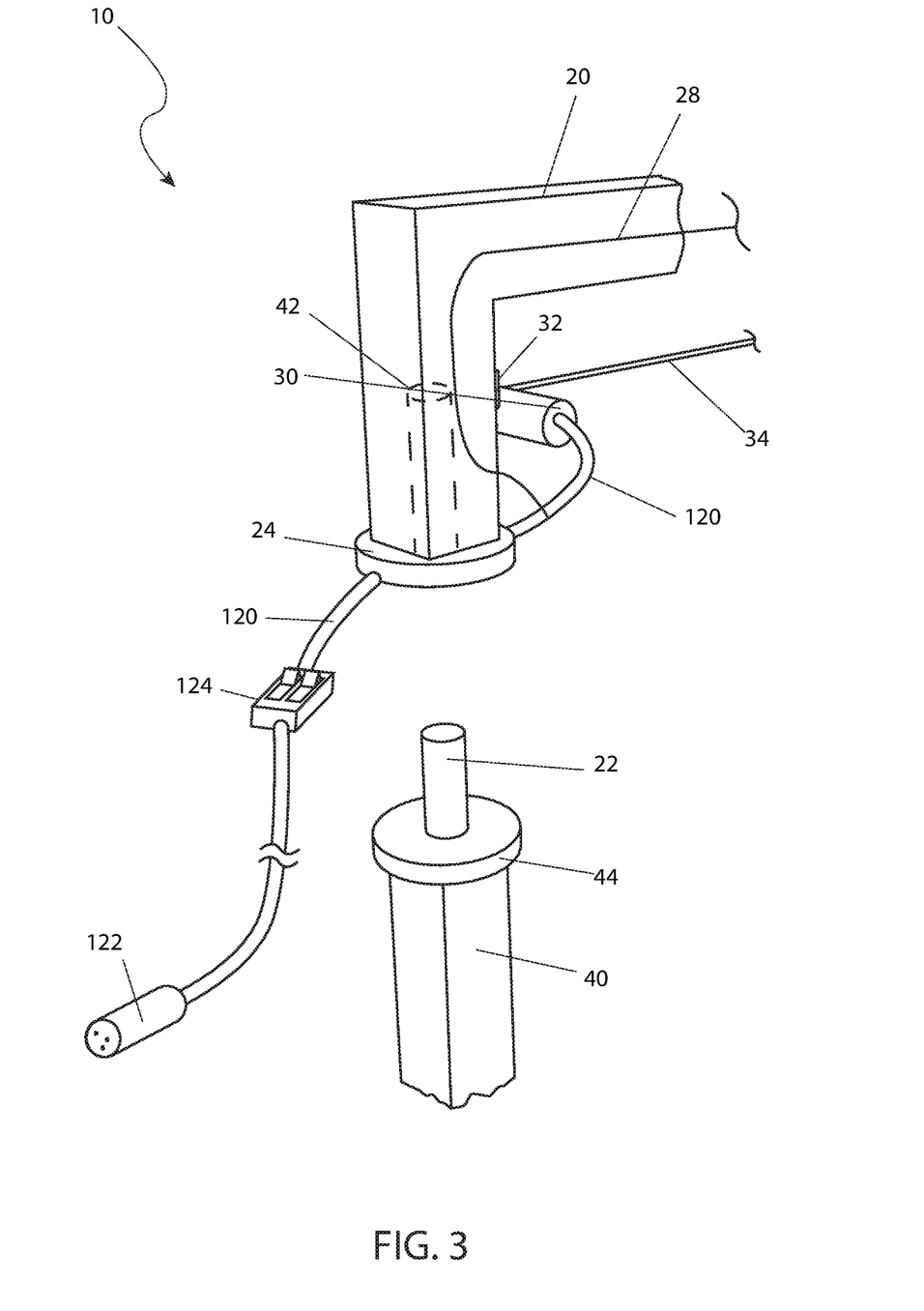

The best mode for carrying out the invention is presented in terms of its preferred embodiment, herein depicted within FIG. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention is directed to a portable hoist 10 providing features to enable motorized hoisting and skinning of animals 150, being especially beneficial when processing large game animals. In one (1) embodiment, the portable hoist 10 includes sections of square tubing which create a frame assembly which includes a top first frame section 20, a vertically subjacent second frame section 40, a vertically subjacent third frame section 50, a vertically subjacent fourth frame section 54, an elbow frame section 56, and a horizontal bottom fifth frame section 58. The superjacent first frame section 20 provides and supports a winch 30, a cable 34, a pulley 36, and a gambrel 110. The bottom fifth frame section 58 includes a pair of clamps 68 for attaching to, and simultaneously hoisting and removing a hide portion 160 of the animal 150 if desired.

Referring now to FIG. 1, an environmental perspective view of a portable hoist 10 depicting attachment to an existing vehicle 125 such as a truck, according to a preferred embodiment of the present invention, is disclosed. The portable hoist 10 is configured here being rigidly attached to a pickup-type existing vehicle 125 via a hitch attachment 90, a first brace 100*a*, and a second brace 100*b*. A user may attach the gambrel 110 to the head, front legs, or rear legs. The winch portion 30 of the portable hoist 10 may then be activated to lift the animal 150 so that it may be motioned over and placed in the vehicle 125, or butchered while hanging, or skinned.

The frame portions 20, 40, 50, 54, 56, 58 of the portable hoist 10 are preferably made using square structural tubing measuring approximately two inches by two inches (2×2 in.), and providing insertable frame connections 80 to attach adjacent frame sections 20, 40, 50, 54, 56, 58 having end portions being shaped and sized so as to enable sliding insertion into frame connection apertures 84 to form length-adjustable frame connections 80. The portable hoist 10 includes a generally "L"-shaped superjacent first frame section 20 having a vertical portion and an inclined upward portion which supports cable 34, pulley 36, and gambrel 110 portions. The vertical portion of the first frame section 20 is joined in a rotating manner to the subjacent second frame section 40 via a swivel rod 22. The swivel rod 22 enables the first frame section 20 to be rotatingly motioned relative to the second frame section 40 in a full three hundred sixty-degree (360°) orientation (see FIG. 3).

The bottom end portion of the second frame section 40 is in turn joined to the third frame section 50 via an inserted frame connection 80 and secured by an adjusting fastener 82. The adjusting fastener 82 is preferably a wing bolt or equivalent impinging threaded fastener. In use, the third frame section 50 may be removed from the portable hoist 10, if desired, to change an overall height of the portable hoist 10, based upon a size of the animal 150 and other conditions.

In like manner, a bottom end portion of the vertical third frame section 50 is joined to the vertical fourth frame section 54 via an inserted frame connection 80 and secured at a desired length using an adjusting fastener 82. The fourth frame section 54 provides removable pivoting attachment of the first 100*a* and second 100*b* braces. Once attached, the braces 100*a*, 100*b* extend in a forwardly manner and provide a rigid connection to opposing bed side portions of an existing vehicle 125 such as a pickup truck. The braces 100*a*, 100*b* are envisioned to be made using a similar tubular material as the frame sections 20, 40, 50, 54, 56, 58. The braces 100*a*, 100*b* are preferably located near the upper end of the fourth frame section 54 and extend perpendicularly outward from the fourth frame section 54. In the embodiment of the braces shown here, a proximal end portion of each brace 100*a*, 100*b* includes an adjusting fastener 82 which threadingly engages each brace 100*a*, 100*b* and a respective side surface of the fourth frame section 54 to secure the braces 100*a*, 100*b* and the portable hoist 10 in position. The distal end portion of each brace 100*a*, 10*b* includes an integral brace eyelet portion 102 being sized and shaped so as to engage and fasten to opposing tailgate cable bolts of a pickup truck 125. It is envisioned that models of the portable hoist 10 would be available with specific braces 100*a*, 100*b* being configured for attachment to other available appendages upon other makes and models of vehicles 125.

In a similar manner as the previously described braces 100*a*, 100*b*, a hitch attachment frame 90 is pivotingly attached to opposing side surfaces of the fourth frame section 54 using respective adjusting fasteners 82. The hitch attachment frame 90 extends perpendicularly forward from the side surfaces of the fourth frame section 54 being inserted and secured in a normal manner within a hitch receiver portion 94 of the vehicle 125 to provide added support for the portable hoist 10. The hitch attachment frame 90 is envisioned to be made using similar square tubing as the frame sections 20, 40, 50, 54, 56, 58.

The bottom end portion of the fourth frame section 54 is in turn joined to a right-angle elbow frame section 56 via an inserted frame connection 80 and is secured by an adjusting fastener 82. The elbow frame section 56 protrudes in a horizontal rearward direction, being in turn joined to a "T"-shaped fifth frame section 58 via an inserted frame connection 80 and is secured by an adjusting fastener 82. The fifth frame section 58 is positioned along a horizontal plane and is to rest upon a ground surface, thereby acting as a stabilizing base portion of the portable hoist 10. Wing portions of the fifth frame section 58 include equipment to enable clamping to a hide portion 160 of an animal 150 for purposes of skinning the animal 150 (also see FIG. 2). The adjustable inserted frame connections 80 and adjusting fastener 82 portions of the portable hoist 10 provide a means to accommodate any tow hitch height of an existing vehicle 125 onto which the portable hoist 10 is to be installed.

The winch 30 is mounted to the first frame section 20 via a bolted or welded winch mount 32 located above the first bearing plate portion 24 of the first frame section 20, being preferably positioned opposite a side where the hitch attachment 90 extends from the fourth frame section 54. A pulley 36 is also mounted to an extending end portion of the first frame section 20 via a bolted or welded pulley mount 37. In a preferred embodiment, the winch 30 is an electrically powered unit which receives power via an integral power cord 120 being routed from the winch 30 and removably attached to an existing power source of the vehicle 125. The power cord 120 includes a power connector 122 which in turn plugs into a corresponding electrical socket portion of the vehicle 125. The power cord 120 is envisioned to also provide power to an illuminating lamp 26. The power cord 120 also includes a lamp cord 28, and an inline switch box 124. The lamp 26 is to be located upon the extending end portion of the first frame section 20 to provide illumination during low light/dark conditions. The lamp 26 is preferably a light-emitting diode (LED) type device or an equivalent illuminating technology. The inline switch box 124 provides switching equipment to separately activate the winch 30 and the lamp 26 when desired (also see FIG. 3).

The winch 30 includes a high-strength hoisting cable 34 having a first end being wound within the winch 30. The cable 34 extends outwardly and passes through a pulley 36 mounted to an extending end portion of the first frame section 20. The cable 34 includes an end portion with a cable hook 115. The cable hook 115 provides removable attachment of the gambrel 110 via an integral gambrel mounting plate portion 114 centrally located along a top surface portion of the gambrel 110. The gambrel 110 includes first gambrel hook 112*a* and second gambrel hook 112*b* portions, being welded to opposing end portions of the gambrel 110. The gambrel 110 may be made using square tubing and/or cold rolled steel, being welded together to form a strong linear structure capable of supporting the weight of the animal 150, or may be utilizing with a length of cord/rope 116 being wrapped around a head portion 155 of the animal 150, as seen here, to hang the animal 150 from the gambrel hooks 112a, 112b.

It is envisioned that once the portable hoist 10 is installed upon the vehicle 125 as previously described, the animal 150 may be hung overnight on the gambrel 110, or utilized to skin the animal 150, or the like. It is also envisioned that the portable hoist 10 may also be utilized in a stand-alone state without attachment to a vehicle 125, if desired. Other embodiments of the portable hoist 10 are envisioned to incorporate the use of solar power technology to provide electrical power to the winch 30, such as while at a remote location such as a hunting base or camp. The exact specifications, materials used, and method of use of the portable hoist 10 may vary upon manufacturing.

Referring now to FIG. 2, a perspective exploded view illustrating a subjacent and supporting fifth frame section 58 of the portable hoist 10, according to the preferred embodiment of the present invention, is disclosed. The fifth frame section 58 is to preferably rest upon a ground surface for additional support. Mounted to end portions of each wing of the fifth frame member 58 is a clamp cable 60 having an integral clamp 68 portion. The clamps 68 enable simultaneous hoisting and skinning of the animal 150, if desired. An embodiment of the fifth frame section 58 is shown here which provides removable attachment of each clamp cable 60 and clamp 68 portion via engagement of an integral clamp cable eyelet portion 66 of each clamp cable 60, and an adjusting fastener 82. Attachment of the clamp cable 60 is accomplished by inserting each clamp cable eyelet 66 into a respective slot portion 62 located at each end of the fifth frame section 58. The clamp cable eyelet 66 is then secured via threaded engagement of an adjusting fastener 82 through a respective welded end plate portion 65 and coincidentally through the clamp cable eyelet 66. The clamps 68 are envisioned to include features to securely clamp and grip the hide 160 of the animal 150 such as opposing jaw portions, toothed or knurled gripping surfaces, a manual tightening means, and the like. Once securely clamped to the hide 160 of the animal 150, the winch 30 would be utilized to hoist the animal 150, thereby pulling downwardly upon the hide 160, and stripping and removing the hide 160 from the carcass of the animal 150.

Referring now to FIG. 3, a perspective exploded view illustrating a rotational attachment means of the first frame section 20 and the second frame section 40 of the portable hoist 10, according to the preferred embodiment of the present invention, is disclosed. The second frame section 40 includes an integral swivel rod 22 which extends upward from a circular second bearing plate 44 located at the terminal portion of the second frame section 40. The swivel rod 22 is capable of being inserted into a correspondingly shaped swivel rod aperture portion 42 within the first frame section 20. In a preferred embodiment, the swivel rod 22 may comprise a one-and-five-eighths (1⅝ in.) inch diameter welded rod.

The respective adjacent end portions of the first 20 and second 40 frame portions also provide respective integral horizontal circular first bearing plate 24 and second bearing plate 44 portions which contact each other in a parallel manner to allow smooth rotation of the first frame section 20 while supporting the animal 150. In a preferred embodiment, the bearing plates 24, 44 are approximately one-quarter inch (¼ in.) in thickness. The swivel rod 22 enables the first frame section 20 and winch 30 portions to be rotationally adjustable relative to the second frame section 40 in a full three hundred sixty degree (360°) orientation. The orientation of the first frame section 20 relative to the second frame section 40 may be secured in position, if desired, via tightening an adjusting fastener portion 82 of the first frame section 20, which impinges against the swivel rod 22 located within the swivel rod aperture 42 (also see FIG. 1).

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the portable hoist 10 to hoist an animal 150 may be achieved by performing the following steps: procuring a model of the portable hoist 10 having desired hitch attachment frame 90 and brace portions 100a, 100b based upon an existing vehicle 125 onto which the portable hoist 10 is to be installed; inserting and attaching the hitch attachment frame 90 into the hitch receiver portion 94 of the existing vehicle 125; placing the fifth frame section 58 upon a ground surface adjacent to the hitch attachment frame 90; inserting the fifth frame section 58 into the horizontal end of the elbow frame section 56; inserting the fourth frame section 54 into the vertical end of the elbow frame section 56; inserting the third frame section 50 into the fourth frame section 54; inserting the second frame section 40 into the third frame section 50; attaching the hitch attachment frame 90 to opposing side surfaces of the fourth frame section 54 using the adjusting fasteners 82; assembling the braces 100a, 100b to opposing side surfaces of the fourth frame section 54 using the adjusting fasteners 82; attaching the brace eyelets 102 to the existing opposing tailgate cable bolts of the vehicle 125; adjusting all inserted frame connections 80 and corresponding adjusting fasteners 82 until the fifth frame section portion 58 of the portable hoist 10 rests securely upon a ground surface; tightening all adjusting fastener portions 82 of the frame sections 40, 50, 54, 56, 58; assembling the first frame section 20 to the second frame section 40 by inserting the swivel rod 22 into the corresponding swivel rod aperture 42; plugging the power connector 122 of the power cord 120 into a corresponding electrical socket portion of the vehicle 125; utilizing the switch box 124 to activate the lamp 37 as needed during low light/dark conditions; feeding out a length of cable 34 from the winch 30 using the switch box 124; attaching the gambrel 110 to the hook portion 115 of the cable 34; hooking leg portions of the animal 150, or a head portion 155 using cord/rope 116, onto the gambrel hooks 112a, 112b; continuing to hoist the animal 150 upward using the winch 30 and switch box 124 until the animal 150 is suspended at a desired height above the ground surface; and, benefiting from a portable and fully adjustable means to hoist an animal 150 for hanging or skinning, afforded a user of the present invention 10.

The method of utilizing the apparatus 10 to skin the carcass of the animal 150 may be achieved by performing the following additional steps: attaching the clamp cables 60 and clamps 68 to end portions of the fifth frame section 58, if not previously attached, by inserting each clamp cable eyelet 66 into a respective slot portion 62 located at each end of the fifth frame section 58; securing the clamp cables 60 by installing the threaded adjusting fasteners 82 through the end plates 65 and through the clamp cable eyelets 66; attaching the clamps 68 to portions of the hide 160 of the animal 150; and, resuming hoisting of the animal 150 using the winch 30 and switch box 124 until the clamps 68 pull downwardly upon, and strip the hide 160 from the carcass of the animal 150.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A hoist, comprising:
   a first frame section comprising:
      a first frame first end;
      a first frame second end;
      a first frame bend, located between said first frame first end and said first frame second end;
      a first bearing plate secured to said first frame second end;
      a swivel rod aperture disposed within said first frame second end and through said first bearing plate;
      a pulley mounted upon an interior side of said first frame adjacent said first frame first end;
      a winch in electrical communication with a power source, mounted upon an interior side of said first frame adjacent said first frame second end and superjacent said first bearing plate; and,
      a cable in mechanical communication with said pulley, having a cable first end secured to said winch and a cable second end having a first attachment means;
   a second frame section comprising:
      a second frame section first end;
      a second frame section second end;
      a second bearing plate disposed upon said second frame first end;
      a swivel rod disposed perpendicularly and centrally upon an exterior face of said second bearing plate capable of rotationally residing within said swivel rod aperture; and,
      a first frame connector aperture disposed within said second frame second end; and,
      wherein when said swivel rod is inserted into said swivel rod aperture, said first bearing plate rests upon said second bearing plate thereby permitting rotation of said first frame section along one axis;
   a third frame section comprising:
      a third frame section first end;
      a third frame section second end;
      a second connector aperture disposed within said third frame section first end;
      a third connector aperture disposed within said third frame section second end; and,
      wherein said second frame second end is removably secured to said third frame first end;
   a fourth frame section comprising:
      a fourth frame section first end;
      a fourth frame section second end;
      a fourth connector aperture disposed within said fourth frame section first end;
      a fifth connector aperture disposed within said fourth frame section second end;
      wherein said third frame second end is removably secured to said fourth frame first end;
   an elbow frame section comprising:
      an elbow frame section first end;
      an elbow frame section second end;
      an elbow bend, located between said elbow frame first end and said elbow frame second end;
      a sixth connector aperture disposed within said elbow frame first end, and,
      a seventh connector aperture disposed within said elbow frame second end; and,
      wherein said fourth frame second end is removably secured to said elbow frame first end; and,
   a fifth frame section having a T-shape comprising:
      a fifth frame section first end;
      a fifth frame section second end;
      a fifth frame section third end;
      an eighth connector aperture disposed within said fifth frame member first end;
      a first end plate disposed upon said fifth frame member second end;
      a second end plate disposed upon said fifth frame member third end;
      a first clamp cable having a first clamp cable first end secured to said first end plate;
      a second attachment means secured to said first clamp cable second end;
      a second clamp cable having a second clamp cable first end secured to said second end plate; and,
      a third attachment means secured to said second clamp cable second end; and,
      wherein said elbow frame second end is removably secured to said fifth frame first end; and,
   a hitch attachment frame removably secured to said fourth frame section;
   wherein a user may raise or lower an animal when said animal is secured to said first attachment means by actuation of said winch;
   wherein said animal may be further secured between said second attachment means and said third attachment means; and,
   wherein said hitch attachment frame enables said hoist to be removably secured to a hitch of a vehicle.

2. The hoist of claim 1, further comprising at least one brace comprising:
   a brace eyelet at a first end; and,
   a hoist attachment means at a second end;
   wherein each said at least one brace is capable of being removably secured to said vehicle at said eyelet end and removably secured to said hoist at said hoist attachment means end.

3. The hoist of claim 1, wherein said first attachment means comprises:
   a cable hook;
   a gambrel removably attached to said cable hook;
   a first gambrel hook disposed at a gambrel first end; and,
   a second gambrel hook disposed at a gambrel second end;
   wherein said animal may be secured to said first gambrel hook and said second gambrel hook.

4. The hoist of claim 1, wherein said first end plate comprises:
   a first end plate aperture; and,
   a first end plate fastener;

wherein a first clamp cable eyelet disposed upon said first clamp cable first end is capable of being removably secured to said first end plate by placement of said first end plate fastener through said first clamp cable eyelet and into said first end plate aperture.

5. The hoist of claim 1, wherein said second end plate comprises:
- a second end plate aperture; and,
- a second end plate fastener;
- wherein a second clamp cable eyelet disposed upon said second clamp cable first end is capable of being removably secured to said second end plate by placement of said second end plate fastener through said second clamp cable eyelet and into said second end plate aperture.

6. The hoist of claim 1, wherein said second attachment means comprises an adjustable clamp.

7. The hoist of claim 1, wherein said third attachment means comprises an adjustable clamp.

8. The hoist of claim 1, further comprising a switch box in electrical communication with said winch thereby enabling selective rotation thereof.

9. The hoist of claim 1, further comprising a light source disposed at said first frame section first end in electrical communication with said power source.

10. The hoist of claim 9, wherein said light source is in electrical communication with said switch box.

11. A hoist, comprising:
- a first frame section comprising:
  - a first frame first end;
  - a first frame second end;
  - a first frame bend, located between said first frame first end and said first frame second end;
  - a first bearing plate secured to said first frame second end;
  - a swivel rod aperture disposed within said first frame second end and through said first bearing plate;
  - a pulley mounted upon an interior side of said first frame adjacent said first frame first end;
  - a winch in electrical communication with a power source, mounted upon an interior side of said first frame adjacent said first frame second end and superjacent said first bearing plate; and,
  - a cable in mechanical communication with said pulley, having a cable first end secured to said winch and a cable second end having a first attachment means;
- a second frame section comprising:
  - a second frame section first end;
  - a second frame section second end;
  - a second bearing plate disposed upon said second frame first end;
  - a swivel rod disposed perpendicularly and centrally upon an exterior face of said second bearing plate capable of rotationally residing within said swivel rod aperture; and,
  - a first frame connector aperture disposed within said second frame second end; and,
  - wherein when said swivel rod is inserted into said swivel rod aperture, said first bearing plate rests upon said second bearing plate thereby permitting rotation of said first frame section along one axis;
- a third frame section comprising:
  - a third frame section first end;
  - a third frame section second end;
  - a second connector aperture disposed within said third frame section first end;
  - a third connector aperture disposed within said third frame section second end; and,
  - wherein said second frame second end is lengthwise selectably secured to said third frame first end by a first fastener disposed adjacent said second frame second end;
- a fourth frame section comprising:
  - a fourth frame section first end;
  - a fourth frame section second end;
  - a fourth connector aperture disposed within said fourth frame section first end; and,
  - a fifth connector aperture disposed within said fourth frame section second end; and,
  - wherein said third frame second end is lengthwise selectably secured to said fourth frame first end by a second fastener disposed adjacent said third frame second end;
- an elbow frame section comprising:
  - an elbow frame section first end;
  - an elbow frame section second end;
  - an elbow bend, located between said elbow frame first end and said elbow frame second end;
  - a sixth connector aperture disposed within said elbow frame first end, and,
  - a seventh connector aperture disposed within said elbow frame second end;
  - wherein said fourth frame second end is lengthwise selectably secured to said elbow frame first end by a third fastener disposed adjacent said fourth frame second end; and,
- a fifth frame section having a T-shape comprising:
  - a fifth frame section first end;
  - a fifth frame section second end;
  - a fifth frame section third end;
  - an eighth connector aperture disposed within said fifth frame member first end;
  - a first end plate disposed upon said fifth frame member second end;
  - a second end plate disposed upon said fifth frame member third end;
  - a first clamp cable having a first clamp cable first end secured to said first end plate;
  - a second attachment means secured to said first clamp cable second end;
  - a second clamp cable having a second clamp cable first end secured to said second end plate; and,
  - a third attachment means secured to said second clamp cable second end; and,
  - wherein said elbow frame second end is lengthwise selectably secured to said fifth frame first end by a fourth fastener disposed adjacent said elbow frame second end; and,
- a hitch attachment frame removably secured to said fourth frame section; and,
- wherein a user may raise or lower an animal when said animal is secured to said first attachment means by actuation of said winch;
- wherein said animal may be further secured between said second attachment means and said third attachment means; and,
- wherein said hitch attachment frame enables said hoist to be removably secured to a hitch of a vehicle.

12. The hoist of claim 11, further comprising at least one brace comprising:
- a brace eyelet at a first end; and,
- a hoist attachment means at a second end;

wherein each said at least one brace is capable of being removably secured to said vehicle at said eyelet end and removably secured to said hoist at said hoist attachment means end.

13. The hoist of claim 11, wherein said first attachment means comprises:
   a cable hook;
   a gambrel removably attached to said cable hook;
   a first gambrel hook disposed at a gambrel first end; and,
   a second gambrel hook disposed at a gambrel second end;
   wherein said animal may be secured to said first gambrel hook and said second gambrel hook.

14. The hoist of claim 11, wherein said first end plate comprises:
   a first end plate aperture; and,
   a first end plate fastener;
   wherein a first clamp cable eyelet disposed upon said first clamp cable first end is capable of being removably secured to said first end plate by placement of said first end plate fastener through said first clamp cable eyelet and into said first end plate aperture.

15. The hoist of claim 11, wherein said second end plate comprises:
   a second end plate aperture; and,
   a second end plate fastener;
   wherein a second clamp cable eyelet disposed upon said second clamp cable first end is capable of being removably secured to said second end plate by placement of said second end plate fastener through said second clamp cable eyelet and into said second end plate aperture.

16. The hoist of claim 11, wherein said second attachment means comprises an adjustable clamp.

17. The hoist of claim 11, wherein said third attachment means comprises an adjustable clamp.

18. The hoist of claim 11, further comprising a switch box in electrical communication with said winch thereby enabling selective rotation thereof.

19. The hoist of claim 11, further comprising a light source disposed at said first frame section first end in electrical communication with said power source.

20. The hoist of claim 19, wherein said light source is in electrical communication with said switch box.

\* \* \* \* \*